US009132420B2

United States Patent
Nakayama et al.

(10) Patent No.: US 9,132,420 B2
(45) Date of Patent: Sep. 15, 2015

(54) METHOD FOR MANUFACTURING METALLIC GLASS NANOWIRE, METALLIC GLASS NANOWIRE MANUFACTURED THEREBY, AND CATALYST CONTAINING METALLIC GLASS NANOWIRE

(75) Inventors: Koji Nakayama, Miyagi (JP); Yoshihiko Yokoyama, Miyagi (JP)

(73) Assignee: TOHOKU UNIVERSITY (JP)

( * ) Notice: Subject to any disclaimer, the term of this patent is extended or adjusted under 35 U.S.C. 154(b) by 76 days.

(21) Appl. No.: 14/112,507

(22) PCT Filed: Apr. 17, 2012

(86) PCT No.: PCT/JP2012/060309
§ 371 (c)(1),
(2), (4) Date: Oct. 17, 2013

(87) PCT Pub. No.: WO2012/147559
PCT Pub. Date: Nov. 1, 2012

(65) Prior Publication Data
US 2014/0045680 A1    Feb. 13, 2014

(30) Foreign Application Priority Data

Apr. 28, 2011    (JP) .................................. 2011-102056

(51) Int. Cl.
*B01J 23/00*    (2006.01)
*B01J 21/00*    (2006.01)
*B01J 25/00*    (2006.01)
(Continued)

(52) U.S. Cl.
CPC .............. *B01J 27/1853* (2013.01); *B01J 23/42* (2013.01); *B01J 23/44* (2013.01); *B01J 23/755* (2013.01); *B01J 35/06* (2013.01); *B22F 1/0025* (2013.01); *B22F 9/002* (2013.01); *B22F 9/082* (2013.01); *B82Y 30/00* (2013.01); *C22C 1/0433* (2013.01); *C22C 1/0458* (2013.01); *C22C 1/0466* (2013.01); *C22C 33/02* (2013.01); *C22C 45/00* (2013.01); *C22C 45/02* (2013.01); *C22C 45/04* (2013.01); *C22C 45/10* (2013.01); *B01J 21/066* (2013.01); *B22F 2999/00* (2013.01)

(58) Field of Classification Search
USPC .......................................... 502/100, 300, 325
See application file for complete search history.

(56) References Cited

U.S. PATENT DOCUMENTS 5,429,725 A * 7/1995 Thorpe et al. .................. 205/631
2006/0185771 A1* 8/2006 Inoue et al. .................... 148/403
(Continued)

FOREIGN PATENT DOCUMENTS

| JP | 3-10041 | 1/1991 | .............. C22C 23/00 |
| JP | 3-158446 | 7/1991 | .............. C22C 45/10 |

(Continued)

OTHER PUBLICATIONS

Nakayama et al. (http://www2.avs.org/symposium2011/Papers/Paper_NS-TuM1.html).*

(Continued)

Primary Examiner — James McDonough
(74) Attorney, Agent, or Firm — Hayes Soloway P.C.

(57) ABSTRACT

Provided is a method for easily manufacturing large volumes of a metallic glass nanowire with an extremely small diameter. This metallic glass nanowire manufacturing method is characterized in that a melted metallic glass or a master alloy thereof is gas-atomized in a supercooled state.

8 Claims, 9 Drawing Sheets

(51) Int. Cl.
*B01J 29/00* (2006.01)
*B01J 27/185* (2006.01)
*C22C 45/00* (2006.01)
*C22C 45/02* (2006.01)
*C22C 45/04* (2006.01)
*C22C 45/10* (2006.01)
*B22F 1/00* (2006.01)
*B22F 9/00* (2006.01)
*B22F 9/08* (2006.01)
*B01J 35/06* (2006.01)
*B01J 23/755* (2006.01)
*C22C 1/04* (2006.01)
*C22C 33/02* (2006.01)
*B82Y 30/00* (2011.01)
*B01J 23/42* (2006.01)
*B01J 23/44* (2006.01)
*B01J 21/06* (2006.01)

(56) References Cited

U.S. PATENT DOCUMENTS

| | | | |
|---|---|---|---|
| 2008/0248222 | A1* | 10/2008 | Ohara et al. ............ 428/34.6 |
| 2010/0281963 | A1* | 11/2010 | Greer ............................ 73/82 |
| 2013/0150230 | A1* | 6/2013 | Taylor et al. ................. 502/1 |

FOREIGN PATENT DOCUMENTS

| | | | | |
|---|---|---|---|---|
| JP | 7-252559 | 10/1995 | ............ | C22C 14/00 |
| JP | 9-279318 | 10/1997 | ............ | C22C 45/00 |
| JP | 2001-62548 | 3/2001 | ............ | B22D 11/06 |
| JP | 2001-254157 | 9/2001 | ............ | C22C 45/00 |
| JP | 2001-303218 | 10/2001 | ............ | C22C 45/02 |
| JP | 2004-42017 | 2/2004 | ............ | B01D 71/02 |
| JP | 2007-92103 | 4/2007 | ............ | C22C 45/00 |
| JP | 2007-131952 | 5/2007 | ............ | C23C 4/06 |
| JP | 2007-247037 | 9/2007 | ............ | C22C 45/04 |
| JP | 2007-332413 | 12/2007 | ............ | C22C 45/04 |
| JP | 2008-1939 | 1/2008 | ............ | C22C 45/10 |
| JP | 2008-24985 | 2/2008 | ............ | C22C 45/02 |
| JP | 2009-275269 | 11/2009 | ............ | B22F 9/08 |
| JP | 2010-18878 | 1/2010 | ............ | B22F 1/00 |
| JP | 2010-144245 | 7/2010 | ............ | C22C 45/10 |
| JP | 2010-229546 | 10/2010 | ............ | B22F 1/00 |
| WO | WO 2005/012591 | 2/2005 | ............ | C23C 14/34 |

OTHER PUBLICATIONS

Mei Zheng et al. "Strong, Transparent, Multifunctional, Carbon Nanotube Sheets" *Science* vol. 309, Aug. 19, 2005. p. 1215-1219 (6 pgs).

Hata et al. "Water-Assisted Highly Efficient Synthesis of Impurity-Free Single-Walled Carbon Nanotubes" *Science* vol. 306, Nov. 19, 2004. p. 1362-1364 (3 pgs).

Min-Feng et al. "Strength and Breaking Mechanism of Multiwalled Carbon Nanotubes Under Tensile Load" *Science* vol. 287, Jan. 28, 2000. p. 637-240 (5 pgs).

Demczyk et al. "Direct Mechanical Measurements of the Tensile Strength and Elastic Modulus of Multiwalled Carbon Nanotubes" *Materials Science & Engineering* A344, 2002. p. 173-178 (6 pgs).

Nakayama et al. "Metallic Glass Nanowire" *Nano Letters* vol. 8. Jan. 15, 2008. p. 516-519 (4 pgs).

Yokoyama et al. "Production of $Zr_{55}Cu_{30}Ni_5Al_{10}$ Glassy Alloy Rod of 30mm in Diameter by a Cap-Cast Technique" *Materials Transactions*, vol. 48 No. 12. Nov. 25, 2007, p. 3190-3192 (3 pgs).

Ishida et al. "World's Smallest Geared-motor Using Micro Gears Made of the Bulk Metallic Glass" Jan. 9, 2005, p. 431-433 (3 pgs).

Akisha Inoue "Stabilization of Metallic Superhold Liquid and Bulk Amorphus Alloys" *Acta Materialia* 2000. p. 279-306 (28 pgs).

International Search Report issued in corresponding PCT Appln. Serial No. PCT/JP2012/060309 with English translation, dated Jun. 13, 2012 (4 pgs).

PCT International Preliminary Report on Patentability issued in corresponding application No. PCT/JP2012/060309, dated Nov. 7, 2013 (5 pgs).

* cited by examiner

METHOD FOR MANUFACTURING METALLIC GLASS NANOWIRE, METALLIC GLASS NANOWIRE MANUFACTURED THEREBY, AND CATALYST CONTAINING METALLIC GLASS NANOWIRE

TECHNICAL FIELD

The present invention relates to a method for manufacturing metallic glass nanowire, a metallic glass nanowire manufactured thereby, and a catalyst containing metallic glass nanowire.

BACKGROUND ART

Research into catalytic reactions has a long history stretching as far back as ammonia synthesis (a nitrogen fixation method) at the beginning of the $20^{th}$ century. In the present day, catalysts are employed in a wide range of applications, such as synthesis of feedstocks for chemical products such as daily living products and the like, and of pharmaceuticals, food products, pesticides and fertilizers, and the like. Catalysts also play a role in reducing carbon dioxide emissions from factories and exhaust gases from automobiles, and there are high expectations that catalysts may provide possible solutions to serious environmental problems of global scale, such as the problems of global warming and acid rain.

A catalytic reaction proceeds on the surface of a solid, and it is therefore necessary to expand the surface area in order to increase the reaction efficiency. In cases in which costly noble metals such as platinum are used as the active catalyst, the catalyst is typically used in the form of nanoparticles measuring 1 to 100 nm in size, supported on the surface of a porous carrier such as alumina, silica gel, ceramic, or the like.

In recent years, due to the development of microscopy techniques having atomic resolution, new nanostructures have been discovered, and nano-scale electronic phenomena, such as quantum effects, are finally becoming understood. There has also been dramatic progress in nanotechnology research aimed at active commercialization and exploitation of the unique material characteristics found in these nano regions. Nanotechnology research, dubbed "nanotech," has attained a measure of general name recognition, but examples of successful instances of commercialization of nanotech on a commercial scale are extremely limited. This is due to the complex production techniques needed to design nanostructures, and to the extreme difficulty in handling them due to their microscopic nanosize. For example, for carbon nanotubes (CNT), which show promise in the future as component materials for electronic devices or mechatronic systems, and which have actually already been commercialized in some areas and are the subject of ongoing competitive research and development efforts, synthesis techniques on the meter level have finally been developed for multilayer CNT (Non-patent document 1), and on millimeter-unit lengths for single layer CNT (Non-patent document 2), although these are in an arrayed form.

As regards the mechanical characteristics of CNT, an astounding value of 63 GPa for tensile strength, measured by an atomic force microscope, has been reported. The strength measurement was made on CNT of short length; about 10 μm (Non-patent document 3). Similar results have been ascertained from transmission electron microscope observation as well, and since no constriction is observed to accompany the rupture process, it was reported that defect sites contribute to rupture (Non-patent document 4). With monocrystal silicon nanowires, which have the highest potential application as transistor elements, length extension remains difficult, and this limitation, which is a problem common to crystalline nanowires, remains a real impediment to commercialization of nanowires.

A critical point in terms of overcoming the length problem stems from the fact that all one-dimensional nanowires to date are composed of crystal phases. Crystalline materials, even those of nano size, typically contain various defect sites such as dislocations, point defects, twinning, grain boundaries, and the like, and the presence of these defect sites exerts considerable influence when extending the length of high-strength nanowires.

In contrast, the metallic glass nanowires discovered by the inventors (Non-patent document 5, Patent Document 1) are composed of amorphous structures, and therefore can retain high strength free from the influence of defect sites such as dislocations. A further advantage is that superplastic working in a supercooled liquid zone unique to vitreous materials can be utilized, making it possible to fabricate high-strength nanowires of lengths measured in millimeter units or greater, which have been difficult to do with past nanowires based on crystalline materials. Furthermore, such metallic glass has excellent functionalities due to its alloy structure, and the design of nanostructures having such excellent functionalities represents a significant contribution to the technical development not only of catalysts, but also of high-performance devices, precision engineered machinery, and the like.

The Inoue group at Tohoku University successfully stabilized a supercooled liquid state of metallic glass exhibiting a distinct glass transition of the sort not observed in normal metals or amorphous alloys, to create a "bulk metallic glass" of very large size, which has attracted attention worldwide as a novel basic material developed in Japan. Because metallic glass does not have dislocations, excellent material characteristics, such as extremely strong resistance to plastic deformation, ultra-high strength, high elastic extension, low Young's modulus, high corrosion resistance, and the like are attained. According to the most recent report, Zr-based bulk metallic glass 30 millimeters in diameter has been successfully produced (Non-patent document 6).

Meanwhile, the mechanical characteristics of these metallic glass materials sufficiently meet requirements as to mechanical strength in precision micro-machinery and micromachine components, and commercialization of these materials has been proceeding at a rapid pace in recent years. A material for the world's smallest geared motor incorporating a high-precision gear (0.3 mm in diameter) has been commercialized (Non-patent document 7). In fatigue tests of this motor, a lifespan 100 times longer than that of a steel gear (SK4) was reported.

As a method for manufacturing these metallic glass nanowires, the inventors previously filed a patent application (Patent Document 2) for a metallic glass nanowire manufacturing method wherein metallic glass of ribbon or rod form, secured at top and bottom at the ends thereof and with the bottom end capable of being placed under traction, is placed with the bottom end thereof under traction within an oxidation-preventive atmosphere; a step of either (a) bringing a mobile heated filament into contact on the vertical with the metallic glass specimen of ribbon or rod form, (b) with electrodes secured at the top and bottom ends, passing current therethrough, interrupting the current just prior to rupture, or (c) heating the metallic glass specimen of ribbon or rod form with a laser, is carried out, to force-heat the metallic glass into a supercooled liquid state; and the metallic glass nanowire formed thereby is force-cooled, to thereby maintain the metallic glass state of the nanowire. However, this method is unsuited to mass production.

Another known method for manufacturing acicular particles efficiently from an amorphous alloy is a method involving employment of a cylindrical body having a recess created through partial recession of the inside wall surface, in which a molten metal of a composition capable of being quench hardened into an amorphous alloy is dripped or sprayed towards a coolant flow, the coolant flow being generated by circulation of a coolant along the inside wall surface of the cylindrical body. However, the metal powder manufactured by this method has an average outside diameter of 10 μm and average length of about 1 mm, whereas a smaller diameter and greater length would be more desirable for employment as a catalyst (Patent Document 3).

In cases in which metallic glass nanowires are employed as catalysts, it is desirable to employ a plurality of reduced-diameter metallic glass nanowires, in order to increase the specific surface area. However, while it is necessary to employ a metallic glass nanofiber composed of a plurality of metallic glass nanowires in order to increase the catalytic activity, to the extent that the diameters have been reduced to the nano level, the metallic glass nanowires are difficult to handle, resulting in the problem that it is difficult to manufacture the individual metallic glass nanowires, and to then form a metallic glass fiber for utilization as a catalyst.

PRIOR ART DOCUMENTS

Patent Documents

Patent Document 1: Japanese Laid-Open Patent Application 2010-18878
Patent Document 2: Japanese Laid-Open Patent Application 2010-229546
Patent Document 3: Japanese Laid-Open Patent Application 2009-275269

Non-Patent Documents

Non-patent Document 1: M. Zhang, S. Fang, A. A. Zakhdov, S. B. Lee, A. E. Aliev, C. D. Willams, K. R. Atkinson, and R. H. Baughman, "Strong, Transparent, multifunctional, carbon nanotube sheets: Science 309, 1215-1219 (2005)
Non-patent Document 2: K. Hata, D. N. Futaba, K. Mizuno, T. Namai, M. Yumura, and S. Iijima, "Water-assisted highly efficient synthesis of free single walled carbon nanotubes," Science 19, 1362-1364 (2004)
Non-patent Document 3: M.-F. Yu, O. Lourie, M. J. Dyer, K. Moloni, T. F. Kelly, and R. S. Ruoff, "Strength and breaking mechanism of multiwalled carbon nanotube under tensile load," Science, 287, 637-640 (2000)
Non-patent Document 4: B. G. Demczyk, Y. M. Wang, J. Cumings, M Hetman, W. Han, A. Zettl, R. O. Ritchie, "Direct mechanical measurement of the tensile strength and elastic modulus of multiwalled carbon nanotubes," Materials Science and Engineering 334, 173-178 (2002)
Non-patent Document 5: K. S. Nakayama, Y. Yokoyama, G. Xie, Q. S. Zhang, M. W. Chen, T. Sakurai, and A. Inoue, "Metallic glass nanowire," Nano. Lett. 8, 516-519 (2008)
Non-patent Document 6: Y. Yokoyama, E. Mund, A. Inoue, and L. Schultz, "Production of Zr55Cu30Ni5Al10 glassy alloy rod of 30 mm in diameter by a cap-cast technique," Mater. Trans. 48, 3190-3192 (2007)
Non-patent Document 7: T. Ishida, H. Takeda, N. Nishiyama, K. Amiya, K. Kita, Y. Shimizu, H. Watanabe, E. Fukushima, Y. Saotome, A. Inoue, "Kinzoku Glass Sei Choseimitsu Gear wo Mochiita Sekai Saisho•Ko Torque Geared Motor," Materia 44, 431-433 (2005)

DISCLOSURE OF THE INVENTION

As a result of conducting painstaking research, the inventors discovered that by heating metallic glass or a master alloy thereof to the melting point or above until melted, followed by gas atomization in a supercooled state, metallic glass nanowires of very small diameter can be manufactured in simple fashion and in large quantities; and moreover that by adjusting the gas pressure during gas atomization, metallic glass nanowires having a fibrous state of entwinement of a plurality of metallic glass nanowires can be manufactured at the same time. The present invention was perfected on the basis of these discoveries.

Specifically, an object of the present invention is to provide a manufacturing method for metallic glass nanowires of very small diameter obtained by heating metallic glass or a master alloy thereof to the melting point or above to melt it, followed by gas atomization in a supercooled state, and for a metallic glass nanowire having a fibrous state of entwinement of a plurality of metallic glass nanowires. A further object of the present invention is to provide a metallic glass nanowire manufactured by the method. Yet another object of the present invention is to provide a catalyst employing metallic glass nanowires having a state of entwinement of the plurality of metallic glass nanowires.

The present invention relates to the metallic glass nanowire manufacturing method, the metallic glass nanowire manufactured by the manufacturing method, and the catalyst containing the metallic glass nanowire, shown below.

(1) A method for manufacturing metallic glass nanowire, characterized in that melted metallic glass or a master alloy thereof is subjected to gas atomization in a supercooled state.

(2) The metallic glass nanowire manufacturing method according to (1) above, characterized in that said metallic glass is one selected from Zr-based, Fe-based, Pd-based, Pt-based, and Ni-based types.

(3) The metallic glass nanowire manufacturing method according to (1) or (2) above, characterized in that said gas atomization is carried out at gas pressure of 10 kgf/cm$^2$ or above.

(4) The metallic glass nanowire manufacturing method according to (1) or (2) above, characterized in that said metallic glass nanowires are in a fibrous state of an entanglement of a plurality of the metallic glass nanowires.

(5) The metallic glass nanowire manufacturing method according to (4) above, characterized in that said gas atomization is carried out at gas pressure of 70 kgf/cm$^2$ or above.

(6) A metallic glass nanowire manufactured by the manufacturing method according to any of (1) to (3) above.

(7) Metallic glass nanowires in a fibrous state of an entanglement of a plurality of the metallic glass nanowires, manufactured by the manufacturing method according to (4) or (5) above.

(8) A catalyst containing metallic glass nanowires in a fibrous state of an entanglement of a plurality of the metallic glass nanowires according to (7) above.

According to the present invention, by gas atomization in a supercooled state, of melted metallic glass or a master alloy thereof, metallic glass nanowires of very small diameter can be manufactured in simple fashion and in large quantities. Moreover, by adjusting the gas pressure during gas atomization, metallic glass nanowires having a fibrous state of entwinement of the plurality of metallic glass nanowires can be manufactured in simple fashion and in large quantities. Moreover, because the metallic glass nanowires having a state of entwinement of a plurality of the metallic glass nanowires are easy to handle when having a state of entwinement, the nanowires can be used directly as a catalyst, without being immobilized on a carrier or the like.

BRIEF DESCRIPTION OF DRAWINGS

FIG. 1 is a schematic view representing a gas atomization device.
FIG. 2 is a graph showing the relationship of actual measurements and a simulation, representing relationships of material temperature and aspect ratio.
FIG. 3 is substituted for a photograph, and is a scanning electron photomicrograph of Fe-based metallic glass nanowires manufactured by the method in a first example.
FIG. 4 shows diagrams, substituting for photographs, of scanning electron photomicrographs of metallic glass nanowire manufactured by the method in a fourth example.
FIG. 5 is a diagram representing the relationship of gas pressure during gas atomization, density of Fe-based metallic glass nanowires, and mean diameter of metallic glass particles, of Fe-based metallic glass nanowires manufactured in the first to fourth examples.
FIG. 6 shows a diagram, substituting for a photograph, of a scanning electron photomicrograph of Zr-based metallic glass nanofibers obtained in a fifth example.
FIG. 7 is a diagram, substituting for a photograph, of a photo representing Zr-based metallic glass nanofibers obtained in the fifth example, having further grown into a mass.
FIG. 8 represents the results of X-ray diffraction of Zr-based metallic glass nanofibers obtained in the fifth example.
FIG. 9 represents the results of differential scanning calorimetry of Zr-based metallic glass nanofibers obtained in the fifth example.

BEST MODE FOR CARRYING OUT THE INVENTION

Figure 1:
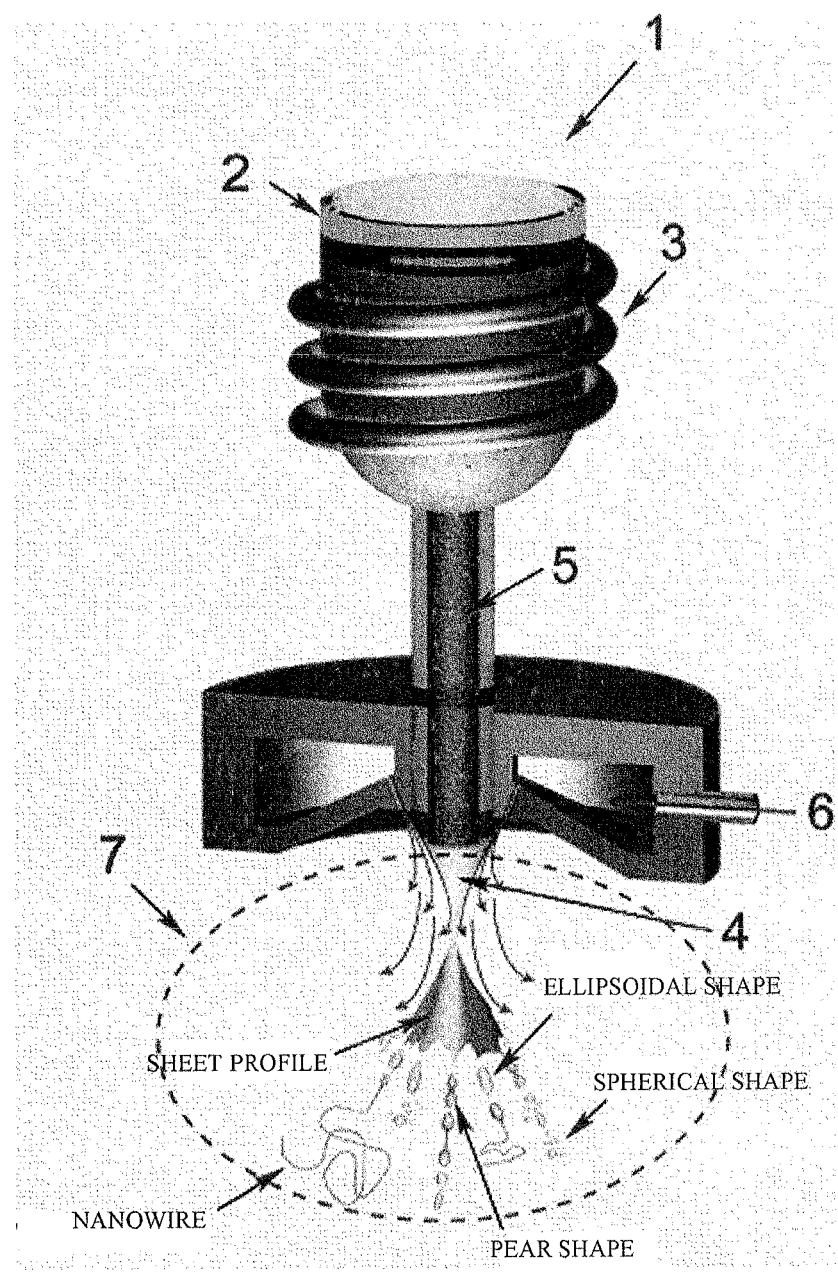
{FIG. 1}

The present invention is characterized in that melted metallic glass or a master alloy thereof undergoes gas atomization in a supercooled state, whereby a metallic glass nanowire of very small diameter, as well as metallic glass nanowires having a fibrous state of entwinement of the plurality of metallic glass nanowires, can be manufactured while preserving an amorphous structure in the metallic glass nanowires. The manufacturing method of the present invention, the metallic glass nanowire manufactured by the manufacturing method, metallic glass nanowires having a state of entwinement of the plurality of metallic glass nanowires, and a catalyst containing metallic glass nanowires having a state of entwinement of the plurality of metallic glass nanowires, are described in specific terms below.

First, metallic glass (also called a glassy alloy) refers herein to one type of amorphous alloy; namely, one that exhibits a distinct glass transition point, with a supercooled liquid region being observed to the high-temperature side of a boundary defined by this glass transition point, distinguishing this material from conventional amorphous alloys. Specifically, upon examination of the thermal behavior of the metallic glass by differential scanning calorimetry, when the glass transition temperature ($T_g$) is exceeded in association with a rise in temperature, an endothermic temperature region appears, an exothermic peak is observed in proximity to the crystallization temperature ($T_x$), and with further heating, an endothermic peak appears at the melting point ($T_m$). These temperature points differ depending on the composition of the metallic glass. The supercooled liquid temperature region ($\Delta T_x$) is defined by $\Delta T_x = T_x - T_g$. Where $\Delta T_x$ is very high, i.e., 50 to 130° C., the cooled liquid state is highly stable, crystallization is avoided, and an amorphous state can be maintained. Such thermal behavior is not observed with conventional amorphous alloys in which no distinct $T_g$ appears.

A metallic glass nanowire refers to a single strand of metallic glass of wire form. A state of entanglement of a plurality of metallic glass nanowires refers to a state of entanglement of at least two or more metallic glass nanowires into a fibrous state; herein, metallic glass nanowires in this state are also referred to as a metallic glass nanofiber.

The term "nano" will be understood to be employed herein to refer to cases in which, of the dimensions x, y, and z representing a three-dimensional space, at least two of the dimensions are of nano size. Herein, "nano size" refers to a size of 1000 nanometers (nm) or less, typically, a size of 100 nm or less. It is possible for the term "nano size" to refer to various sizes of 1000 nm or less, depending on the type of metallic glass; typically sizes of 100 nm or less will be included. It will be understood that in the metallic glass nanowire of the present invention, the wire diameter is indicated as being of the aforementioned "nano size". As will be appreciated from the preceding, in the metallic glass nanowire of the present invention, one dimension, for example, the length, may be greater than the aforementioned "nano size," and sizes of 1 micrometer (μm) or greater, for example, are included.

A stable supercooled liquid state is necessary in order to manufacture metallic glass of bulk form. As a composition for achieving such a state, the following empirical rules have been reported:

(1) the composition is a multi-component system of three or more components (2) the atomic dimension ratios of the three principal components differ from one another by 12% or more (3) the values for the heat of mixing of the three principal components are mutually negative (see A. Inoue, Stabilization of metallic supercooled liquid and bulk amorphous alloys, Acta Mater., 48, 279-306 (2000)).

There are various known examples of compositions of metallic glass materials; the materials disclosed, for example, in Japanese Laid-Open Patent Application 3-10041, Japanese Laid-Open Patent Application 3-158446, Japanese Laid-Open Patent Application 7-252559, Japanese Laid-Open Patent Application 9-279318, Japanese Laid-Open Patent Application 2001-254157, Japanese Laid-Open Patent Application 2001-303218, Japanese Laid-Open Patent Application 2004-42017, Japanese Laid-Open Patent Application 2007-92103, Japanese Laid-Open Patent Application 2007-247037, Japanese Laid-Open Patent Application 2007-332413, Japanese Laid-Open Patent Application 2008-1939, Japanese Laid-Open Patent Application 2008-24985, and U.S. Pat. No. 5,429,725 may be cited.

As metallic glasses, a number of systems, starting with Ln-Al-TM, Mg-Ln-TM, Zr—Al-TM (where Ln indicates a rare earth metal element and TM a transition metal) and the like, have been discovered, and numerous compositions have been reported up to the present time. The glass alloys may include bulk glass alloys that are Mg based, rare earth metal based, Zr-based, Ti based, Fe-based, Ni-based, Co based, Pd-based, Pd—Cu based, Cu based, Al based, or the like.

$X_aM_bAl_c$ (X: Zr, Hf, M: Ni, Cu, Fe, Co, Mn, 25≤a≤85, 5≤b≤70, 0≤c≤35) is known to be an amorphous alloy having a wide temperature range of the supercooled liquid region, and exceptional workability. See, for example, Japanese Laid-Open Patent Application 3-158446.

A Zr-based metallic glasses, there may be cited those containing more Zr relative to other elements in the alloy, and containing, besides Zr, one or more elements selected from the group comprising Group 4 elements (e.g., Ti, Hf, or other elements besides Zr), Group 5 elements (e.g., V, Nb, Ta, and the like), Group 6 elements (e.g., Cr, Mo, W, and the like), Group 7 elements (e.g., Mn and the like), Group 8 elements (e.g., Fe and the like), Group 9 elements (e.g., Co and the like), Group 10 elements (e.g., Ni, Pd, Pt, and the like), Group 11 elements (e.g., Cu, Ag, and the like), Group 13 elements (e.g., Al, and the like), Group 14 elements (e.g., Si and the like), Group 3 elements (e.g., Y, lanthanide elements, and the like), and the like (here and subsequently, the periodic table of the elements is based on the IUPAC Nomenclature of Inorganic Chemistry, 1989). The Zr content will differ depending on the elements that are contained besides Zr, but in typical cases is 40 mass % or more, preferably 45 mass % or more, and more preferably 50 mass % or more, with respect to the alloy total. In specific terms, Zr-based alloys such as $Zr_{50}Cu_{40}Al_{10}$ (herein, subscripted numbers indicate atomic percent), $Zr_{55}Cu_{30}Al_{10}Ni_5$, $Zr_{60}Cu_{20}Al_{10}Ni_{10}$, $Zr_{65}Cu_{15}Al_{10}Ni_{10}$, $Zr_{65}Cu_{18}Al_{10}Ni_7$, $Zr_{66}Cu_{12}Al_8Ni_{14}$, $Zr_{65}Cu_{17.5}Al_{7.5}Ni_{10}$, $Zr_{48}Cu_{36}Al_8Ag_8$, $Zr_{42}Cu_{42}Al_8Ag_8$, $Zr_{41}Ti_{14}Cu_{13}Ni_{10}Be_{22}$, $Zr_{55}Al_{20}Ni_{25}$, $Zr_{60}Cu_{15}Al_{10}Ni_{10}Pd_5$, $Zr_{48}Cu_{32}Al_8Ag_8Pd_4$, $Zr_{52.5}Ti_5Cu_{20}Al_{12.5}Ni_{10}$, $Zr_{60}Cu_{18}Al_{10}Co_3Ni_9$, and the like may be cited. Of these, $Zr_{65}Cu_{18}Al_{10}Ni_7$, $Zr_{50}Cu_{40}Al_{10}$, $Zr_{65}Cu_{15}Al_{10}Ni_{10}$, $Zr_{48}Cu_{32}Al_8Ag_8Pd_4$, $Zr_{55}Cu_{30}Al_{10}Ni_5$, and other such Zr-based glass alloys may be cited as being especially preferred.

Metallic glass having Pd and Pt as mandatory components has been reported as a metallic glass, and reference can be made, for example, to Japanese Laid-Open Patent Application 9-279318. Another known metallic glass material is $Ni_{72}$—$Co_{(8-x)}$-$Mo_x$—$Z_{20}$ (x=0, 2, 4, or 6 atomic percent, Z=metalloid element), and reference can be made, for example, to U.S. Pat. No. 5,429,725. It is known that, besides Pd, metals such as Nb, V, Ti, Ta, Zr, and the like have hydrogen permeability, and metallic glasses centered on such metals are able to exhibit hydrogen selectivity.

As further metallic glasses, Nb—Ni—Zr-based, Nb—Ni—Zr—Al base, Nb—Ni—Ti—Zr-based, Nb—Ni—Ti—Zr—Co base, Nb—Ni—Ti—Zr—Co—Cu base, Nb—Co—Zr-based, Ni—V—(Zr, Ti) base, Ni—Cr—P—B base, Co—V—Zr-based, Cu—Zr—Ti base, and the like may be cited, and reference can be made, for example, to Japanese Laid-Open Patent Application 2004-42017. In specific terms, $Ni_{60}Nb_{15}Ti_{15}Zr_{10}$, $Ni_{65}Cr_{15}P_{16}B_4$, and other such Nb—Ni—Ti—Zr-base glass alloys or Ni—Cr—P—B base glass alloys may be cited as being especially preferred.

As an appropriate metallic glass for use in the present invention, there may be cited a metallic glass composed of a plurality of elements, containing as a principal component at least one of the atoms Fe, Co, Ni, Ti, Zr, Mg, Cu, and Pd, in a range of 30 to 80 atomic percent. Further, one or more species of metal atoms from the groups may be combined, in ranges of 10 to 40 atomic percent of the Group 6 elements (Cr, Mo, W) and 1 to 10 atomic percent of the Group 14 elements (C, Si, Ge, Sn). Depending on the objective, Ca, B, Al, Nb, N, Hf, Ta, P and other such elements may be added in ranges within 10 atomic percent, to the iron group elements. Any material having high glass formability due to these parameters will be satisfactory.

As an appropriate metallic glass for use in the present invention, one in which the Fe content of the metallic glass is 30 to 80 atomic percent is appropriate. The aforementioned metallic glass composition contributes to lower temperature workability while simultaneously forming a metallic glass layer of a stable amorphous phase, so that a lamellar structure of crystalline metal texture and uniform glass texture can form. As preferred compositions, there may be cited, for example, $Fe_{76}Si_{9.6}B_{8.4}P_6$, $Fe_{43}Cr_{16}Mo_{16}C_{15}B_{10}$, $Fe_{75}Mo_4P_{12}C_4B_4Si_1$, $Fe_{52}Co_{20}B_{20}Si_4N_4$, $Fe_{72}Al_5Ga_2P_{11}C_6B_4$, and the like.

As an appropriate metallic glass for use in the present invention, one having a composition shown by $Fe_{100-a-b-c}Cr_aTM_b(C_{1-x}B_xP_y)_c$ (in the formula, TM=at least one or more species from V, Nb, Mo, Ta, W, Co, Ni, and Cu; and a, b, c, x, and y are respectively such that 5 atomic percent ≤a≤30 atomic percent, 5 atomic percent ≤b≤20 atomic percent, 10 atomic percent ≤c≤35 atomic percent, 25 atomic percent ≤a+b≤50 atomic percent, 35 atomic percent ≤a+b+c≤60 atomic percent, 0.11≤x≤0.85, and 0≤y≤0.57). Reference can be made, for example, to Japanese Laid-Open Patent Application 2001-303218 for the metallic glass in question.

The metallic glass may be a soft magnetic Fe-based metallic glass alloy; reference can be mad, for example, to Japanese Laid-Open Patent Application 2008-24985, and to all patent documents and reference documents cited therein. The soft magnetic metallic glass alloys may include, for example, Fe—(Al, Ga)-metalloid base, (Fe, Co, Ni)—(Zr, Hf, Nb, Ta)—B base, (Fe, Co)—Si—B—Nb base, (Fe, Co)-Ln-B base, and Fe—Si—B—P—(C) base systems, or the like. Hard magnetic metallic glass alloys are known as well, and these hard magnetic metallic glass alloys may include, for example, Fe—Nd—B base, Fe—Pr—B base, and Fe—Pt—B base systems, or the like.

For Co-based metallic glass, reference can be made, for example, to Japanese Laid-Open Patent Application 2007-332413 and to all patent documents and reference documents cited therein. For Ni-based metallic glass, reference can be made, for example, to Japanese Laid-Open Patent Application 2007-247037 and to all patent documents and reference documents cited therein.

For Ti-based metallic glass, reference can be made, for example, to Japanese Laid-Open Patent Application 7-252559 or Japanese Laid-Open Patent Application 2008-1939, and to all patent documents cited therein. As preferred compositions, for example, $Ti_{50}Cu_{25}Ni_{15}Zr_5Sn_5$, $Mg_5ONi_{30}Y_{20}$, and the like may be cited.

In the present invention, these metallic glasses are melted, and subjected to gas atomization in a supercooled state; however, the corresponding master alloy may be employed in place of the metallic glass. Normally, the metallic glass manufacturing process involves first weighing out the metal elements in the target composition ratios, and melting these to a sufficient extent to obtain a state of uniform element distribution and manufacture a master alloy. Metallic glass is then manufactured by re-melting and liquid-quenching the master alloy. The gas atomization device of the present invention can sufficiently melt a master alloy, which can then be employed in manufacture of metallic glass nanowires and metallic glass nanofibers.

The metallic glass nanowires manufactured according to the manufacturing method of the present invention may include metallic glass nanowires of various different shapes, and there are various other permissible forms depending on the type of metallic glass. For example, nano-scale fine wire, fibers (nanofibers), filaments, rods (nanorods), and the like may be cited.

In the case of metallic glass nanowires, there can be cited those having fine wire diameter of 1000 nm or smaller in size, and typically 100 nm or smaller in size, or 50 nm or smaller in size. Metallic glass nanofibers are constituted through entanglement of these metallic glass nanowires.

As to the metallic glass wire diameter, a number of sizes are possible depending on the type of metallic glass, and various sizes are possible from among those 1000 nm or smaller in size; for example, those having size of 10 nm or smaller would be included. As to the fine wire length of the metallic glass nanowire, lengths of 1 µm or greater are possible, and those of 10 µm or greater, for example, 0.1 mm or greater, or 1.0 cm or greater, may be obtained as well.

As yet another specific example, metallic glass nanowires having diameter, of about 50 to 100 nm, and fine wire length of 20 to 300 µm, may be cited. As yet another specific example, metallic glass nanowires having diameter of about 100 to 500 nm, and fine wire length of 300 to 10,000 µm, may be cited. As yet another specific example, metallic glass nanowires having diameter of about 500 to 1000 nm, and fine wire length of 500 to 10,000 µm, may be cited. It is not necessary for thicknesses of the aforementioned metallic glass nanowires or other wire materials to be all the same, and materials that different somewhat in size may be included.

The description turns next to the device employed for gas atomization of the present invention, FIG. 1 is a drawing showing an example of a gas atomization device applicable to the present invention.

The gas atomization device 1 is a device that includes, at a minimum, a sapphire crucible 2 into which the starting material metallic glass or master alloy is placed; an induction heating coil 3 coiled about the outside periphery of the sapphire crucible 2, for melting the metallic glass or master alloy; a molten flow 5 of melted metallic glass or master alloy, directed to a spray port 4; and a gas injection port 6. Once the metallic glass alloy has been heated and melted to the melting point or above by the induction heating coil 3, the molten flow 5, which has supercooled down to the supercooled temperature region so as to increase the viscosity, is sprayed/quenched towards a gas diffusion zone 7 by a pressure generating device (not shown), at a spray pressure set such that the pressure differential between the pressure in the top part of the sapphire crucible 2 and the bottom part of the spray port 4 is 0.1 to 0.5 kgf/cm². Due to high pressure gas injected in from the gas injection port 6, the molten flow 5 is atomized within the gas diffusion zone 7, whereby metallic glass nanowires and metallic glass nanofibers are manufactured. The metallic glass nanowires and metallic glass nanofibers accumulate within a chamber (not shown) in the bottom part of the gas atomization device 1.

Ordinarily, during manufacture of a powder by gas atomization, it is necessary for the viscosity of the starting material to be low in order to obtain a spherical shape through surface tension. Consequently, in order to manufacture a powder of high quality, the starting material is employed in a liquid phase state at high temperature at or above the melting point. In the present invention, however, it is necessary for the melted metallic glass to be in a supercooled liquid state as it forms the molten flow 5 and is sprayed from the spray port 4, and atomized within the gas diffusion zone 7. The supercooled liquid temperature of the metallic glass will differ depending on the composition of the metallic glass employed, but should be such that, while maintaining an amorphous state, the shape of the metallic glass is easily changed to a wire shape due to having appropriate viscosity. For this reason, the molten flow 5 of metallic glass is sprayed into the gas diffusion zone 7 through spray pressure, and atomized by high gas pressure. In so doing, metallic glass of various shapes, not only nanowires and nanofibers, but also sheet-form, ellipsoid, spherical, pear-form, and other shapes may be formed.

Figure 2:
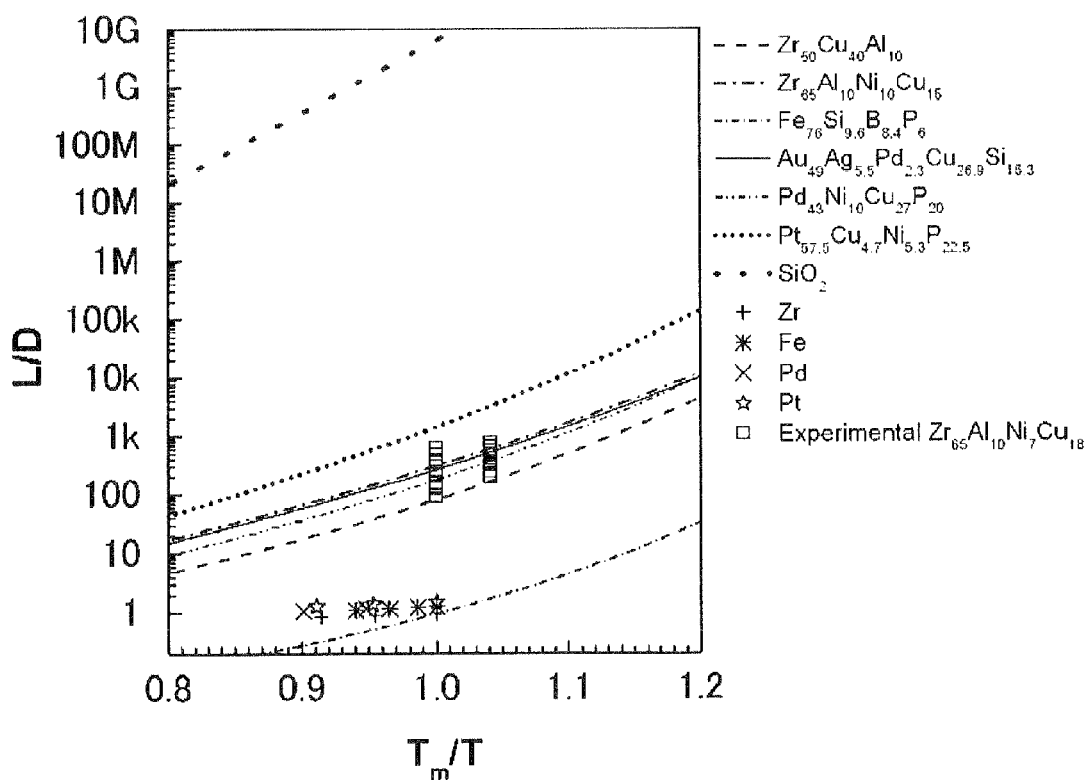
{FIG. 2}

The aspect ratio (nanowire length/nanowire diameter) of the metallic glass nanowires can be adjusted via the temperature of the metallic glass as it is sprayed from the spray port 4. FIG. 2 shows the relationship of actual measurements and a simulation graph, representing relationships of metallic glass temperature and aspect ratio. In FIG. 2, Tm on the horizontal axis shows the melting point of the metallic glass, and T shows the temperature of the metallic glass. On the vertical axis, L represents the length of the metallic glass nanowire, and D the diameter of the metallic glass nanowire, while ○ are measured values in Examples 5 and 6, discussed below. As melting points (Tm) of the metallic glasses differ depending on the material, these are normalized by dividing by the temperature (T), so that any metallic glass material has a value of 1 when the temperature equals the melting point.

The simulation graph of FIG. 2 is derived in the following manner from expression (1) below, which represents an experimentally verified concept of string-forming property.

{Expression 1}

$$L = D \cdot V \cdot \eta(T)/\gamma(T) \tag{1}$$

In the aforementioned expression (1), L represents the string length, D represents the diameter of the metallic glass nanowire, V represents the string formation speed, $\eta(T)$ represents the viscosity, and $\gamma(T)$ represents the surface tension.

The aforementioned $\gamma(T)$ is represented by expression (2) below, which is ordinarily called Eotvos' Law.

{Expression 2}

$$\gamma(T) = k_\gamma \cdot V_m^{-2/3}(T_C - T) \tag{2}$$

In the aforementioned expression (2), $T_c$ represents the critical temperature meeting the condition that $\gamma(T_c)=0$, $V_m$ represents volume, and $K_\gamma$ represents the Eotvos constant. The expression shows that $\gamma(T_c)$ has a linear relationship to temperature.

By contrast, $\eta(T)$ of metallic glass is represented by expression (3) below, by the Vogel-Fulcher-Tammann rule (VFT).

{Expression 3}

$$\eta(T) = \eta_0 \cdot \exp\{D^* T_0/(T - T_0)\} \tag{3}$$

In the aforementioned expression (3), $\eta_0$ represents infinite temperature, $D^*$ represents a fragility element, and $T_0$ represents VTF temperature. It is clear from the aforementioned expression (3) that $\eta(T)$ increases exponentially as temperature falls.

Expression (4) below, for deriving the aspect ratio (L/D), is derived by substituting expression (2) and expression (3) into expression (1).

{Expression 4}

$$L/D = \frac{V \cdot \eta_0 \cdot \exp\{D^* T_0/(T - T_0)\}}{k_\gamma \cdot V_m^{-2/3}(T_C - T)} \tag{4}$$

FIG. 2 shows simulation results obtained when the temperature (T) of the aforementioned expression (4) is changed. The parameters $k_\gamma \cdot V_m^{-2/3}$, $T_C$, $\eta_0$, $D^*$, and $T_0$ of $Fe_{76}Si_{9.6}B_{8.4}P_6$ and $Zr_{50}Cu_{40}Al_{10}$ were determined by the electrostatic levitation method (See Arai, T. Thesis (Gakusyuin University, 2010). For Fe-MG, we used $\gamma(T)=1.06\times10^{-3}$ (3061−T) and $\eta(T)=4\times10^{-5}\exp\{7\times657/(T-657)$, and Yokoyama, Y.; Ishikawa T.; Okada J. T.; Watanabe, Y.; Nanao S.; Inoue A, J. Non-Cryst. Solids 2009, 355, 317-322. For $Zr_{50}Cu_{40}Al_{10}$, we used $\gamma(T)=1.9\times10^{-4}$ (9393−T) and $\eta(T)=4\times10^{-5}\exp\{11\times496/(T-496)\}$).

For $Zr_{65}Al_{10}Ni_{10}Cu_{15}$, $Pd_{43}Ni_{10}Cu_{27}P_{20}$, $Pt_{57.5}Cu_{15}Mo_{14}Er_2C_{15}B_6$, and $Au_{49}Ag_{5.5}Pd_{2.3}Cu_{26.9}Si_{16.3}$, the numerical value reported by Schrorers, J., Acta. Mater. 2008, 56, 471-478 was employed as the $\eta(T)$ parameter, in a hypothetical case of $\gamma=1$ N/m.

As comparisons, $SiO_2$ and the pure metals Zr, Fe, Pd, and Pt are included on the melting point plot. For the comparison T and Tm, the values disclosed by Iida, T. Guthrie, R. I. L., The physical properties of liquid metals (Clarendon Press, Oxford (1988) p. 120-184, Angell, C. A., Science 1995, 267, 1924-1935, Walker, D. Mullins Jr., O. Contrib. Mineral. Petrol. 1981, 76, 455-462, and Kaptay, G. Z., Metallkd. 2005, 96, 1-8 were employed.

As will be apparent from FIG. 2, in cases in which the temperature of a metallic glass during spraying from the spray port 4 is equal to its melting point, the aspect ratio of Zr-based metallic glass nanowires is approximately 100, with the aspect ratio becoming exponentially greater as the temperature of the glass during spraying drops (to Tm/T>1).

On the other hand, when the temperature of $Fe_{76}Si_{9.6}B_{8.4}P_6$ and pure metals when sprayed from the spray port 4 is set to the same temperature as the melting point (Tm), the aspect ratio is 1. Consequently, the aspect ratio can be changed by varying the temperature of the metallic glass when sprayed from the spray port 4, according to the melting point of the metal material employed.

In the aforementioned manner, the difference between metallic glass and an amorphous alloy has to do with whether a supercooled fluid state exists, and therefore the present invention is applied to all molten glasses that possess a supercooled fluid state. Higher $\Delta T_x$ of a metallic glass promotes superplastic working through viscous flow. Consequently, to manufacture metallic glass nanowires, it is preferable for the material to have high $\Delta T_x$. In particular, because metallic glass nanofibers are constituted by a plurality of entangled metallic glass nanowires, it is preferable for the metallic glass nanowires to be manufactured in large quantities, and the metallic glass employed will preferably have higher $\Delta T_x$. From this standpoint, of the metallic glasses shown by way of example above, Fe-based materials having $\Delta T_x$ of about 50° C. are preferable for the manufacture of metallic glass nanowires, and Zr-based materials having $\Delta T_x$ of about 100° C. are preferable for the manufacture of metallic glass nanofibers.

The gas employed in the gas atomization method of the present invention is not particularly limited provided it is a gas, such as argon, helium, hydrogen, or the like. Of these, argon is preferred, due to its inertness, as well as for economic reasons.

According to the present invention, a metallic glass having been brought to a supercooled liquid state by heating is pulverized by a high-pressure inert gas in the gas diffusion zone, to manufacture metallic glass nanowires. Therefore, manufacture of the metallic glass nanowires easier at higher inert gas pressures. Moreover, because metallic glass nanofibers are constituted of a plurality of entangled metallic glass nanowires, it is preferable to manufacture the metallic glass nanowires in large quantities in order to manufacture metallic glass nanofibers, making higher inert gas pressures preferable. Therefore, while the gas pressure will differ depending on the viscosity of the metallic glass being employed, ordinarily, 10 $kgfcm^{-2}$ or above is typical, and 70 $kgfcm^{-2}$ or above is preferred. Furthermore, for metallic glass nanofiber manufacture, 70 $kgfcm^{-2}$ or above is typical, and 90 $kgfcm^{-2}$ or above is preferred. The upper limit of gas pressure is ordinarily 105 $kgfcm^{-2}$, but there is no particular limitation, provided that the range is such that metallic glass nanowires or metallic glass nanofibers can be manufactured.

The present metallic glass nanowires are materials that afford a key to nanomaterials (NMS), and are useful as electrode materials, motor materials, nanoelectronics materials, nano medical devices, nano sensors, optical materials, and the like. Metallic glass nanowires can be utilized, for example, as magnetic materials, wiring in semiconductors, electrode materials, and the like, as well as in medical equipment, nanotechnology applied equipment, magnetic materials, electronic equipment, and the like. The mechanical strength of these metallic glass nanowires, metallic glass nanofibers, and the like is unaffected by localized defects or dislocations, making them useful as ultra-high strength materials and hyperelastic extensible materials in the nano domain.

Metallic glass, and bulk metallic glass in particular, is a sticky glass exhibiting high tensile strength and a large elastic limit value. The materials also have great rupture strength, exhibit high toughness and the like, giving them high hardness, high elasticity, and very high strength, and exhibit excellent corrosion resistance and wear resistance. Metallic glass is a material that also exhibits a low Young's modulus, and has smoothness and transfer properties, and is moreover a material of high specific surface area, having high magnetic permeability and scratch resistance as well, and is desirable as a magnetic material. Making use of its exceptional properties such as mechanical strength, corrosion resistance, surface smoothness, precision casting properties, superplasticity, and the like, metallic glass has potential for utilization in applications such as electromagnetic valves, actuators, spring components, position sensors, reception sensors, magnetic sensors, tension sensors, strain sensors, torque sensors, pressure sensors, and the like. Application in endoscopes, rotablators, thrombus suction catheters, and other such medical equipment; in industrial equipment including precision engineering equipment and small-scale/high-performance industrial devices; or in inspection robots, industrial robots, microfactories, or the like, may be envisioned as well. Metallic glass materials further have the potential for implementation or application, for example, in cutting tools, spring materials, high-frequency transformers, choke coils, high-speed mechanism components, precision mechanical parts, precision optical components, spacecraft materials, electrode materials, fuel cell components, transport equipment components, aviation components, precision medical equipment, nuclear power plants, biomaterials, chemical plants, and the like. Consequently, metallic glass nanowires and the like have the potential for utilization in fields in which the characteristics of the metallic glass are put to use, and in a wide range of fields such as the fields of micromachines, semiconductors, precision electronic parts, and the like.

Moreover, nanowires are crucial constituent material elements when building nanoelectronic mechanical systems. Therefore, it is possible for characteristics such as ultra-high strength, hyperelastic extensibility, ultra-soft magnetic properties, and the like possessed by metallic glass to be leveraged through use of the metallic glass nanowires of the present invention and the like in the nano domain. The materials can be utilized not only as substrate materials in nanoelectronic mechanical systems, but also as nano magnetic sensors utilizing the magnetic impedance effect, or as hydrogen sensors that can detect with high sensitivity changes in resistance values due to hydrogen occlusion.

Furthermore, through adjustment of the starting material and the conditions for gas atomization, the metallic glass nanofibers of the present invention can be grown so that the metallic glass nanofibers form a mass, and can be easily handled with tweezers or the like. Because the metallic glass nanofibers are composed of entangled metallic glass nanowires, the specific surface area is high, and the materials can be used independently without being immobilized on a carrier, and are therefore suitable as catalysts. Moreover, in contrast to polymer fibers or glass fibers, metallic glass nanofibers, being based on metal materials, can be utilized as fuel cell electrodes or ion filters.

While the present invention is described with more specificity below in terms of certain examples, the examples are merely illustrative of the present invention, and are provided for reference to certain specific modes. While certain specific modes of the present invention are illustrated in exemplary fashion thereby, the scope of the invention disclosed herein is in no way limited or restricted thereby.

EXAMPLES (Preparation of Metallic Glass)
(Preparation of Fe-Based Metallic Glass)

Approximately 34.9 g of commercially available ferrosilicon (Si: 76.6 wt %) (made by Toyo Denka Kogyo) approximately 78.2 g of ferroboron (14.6 wt %), approximately 74.3 g of ferrophosphorus (23.4 wt %), and 312.6 g of industrial pure iron were weighed out. After bringing about a high vacuum in a high-frequency melting furnace, melting was carried out in Ar gas. Once sufficiently melted, the material was flowed into a copper casting mold and solidified to produce $Fe_{76}Si_{9.6}B_{8.4}P_6$.

(Preparation of Zr-Based Metallic Glass)

Commercially available metal elements were weighed out to the target composition, and alloying was carried out, employing an arc melting furnace brought to a state of sufficient vacuum and then filled with an Ar atmosphere. For the arc melting process, inverting and remelting were repeated for a minimum of four cycles, limiting the amount of molten alloy in any one cycle to 40 g or less so as to obtain a sufficiently uniform state, to obtain $Zr_{65}Cu_{18}Al_{10}Ni_7$.

Example 1

Figure 3:
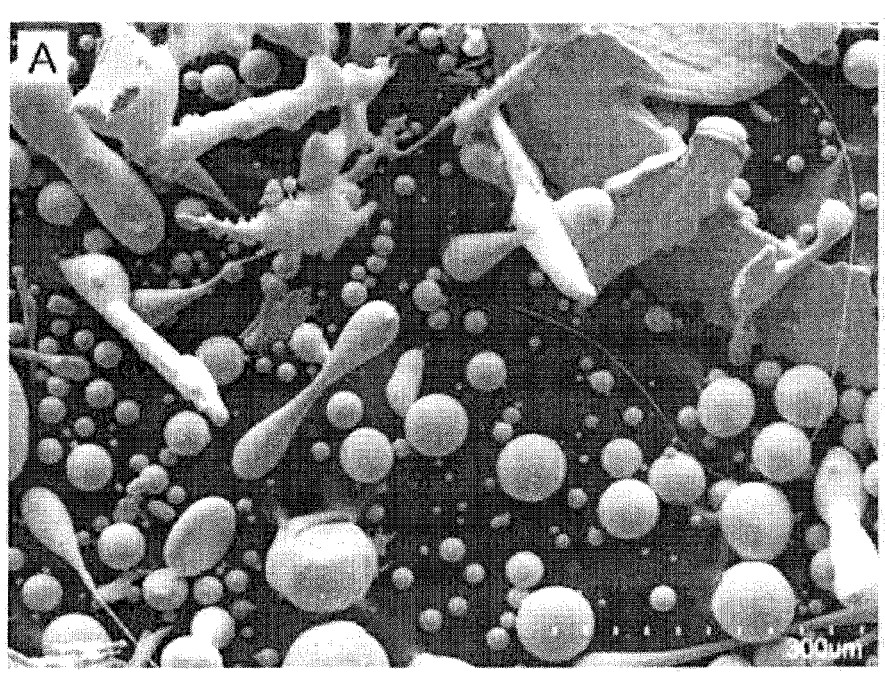
{FIG. 3}

40 g of metallic glass having the composition $Fe_{76}Si_{9.6}B_{8.4}P_6$ prepared as described above in (Preparation of Fe-based metallic glass) was placed in the crucible 2 of a gas atomization device (made by Makabe R&D Co. Ltd.: compact gas atomization device VF-RQP-100), bringing the melt to 1300 K with the induction heating coil 3. The molten flow 5 was sprayed out at 0.3 kgf/cm$^2$ through the spray port 4 in the bottom of the crucible 2, employing high-pressure argon gas at 18 kgf/cm$^2$ in the gas diffusion zone 7 to spray it until no more melt was left in the crucible 2. FIG. 3 is a scanning electron microscopy (SEM) photo of metallic glass nanowires obtained in Example 1. It was verified that metallic glass nanowires had formed, together with spherical particles, thin fragments of irregular shape, and metallic glass particles of ellipsoidal shape. The average number density of metallic glass nanowires which formed was 1.9 per mm$^2$, and the particle mean diameter of the spherical metallic glass particles was 8.8 μm.

Example 2

Gas atomization of metallic glass was carried out in the same manner as in Example 1, except for setting the gas pressure to 42 kgf/cm$^2$. The average number density of metallic glass nanowires which formed was 7.2 per mm$^2$, and the particle mean diameter of the spherical metallic glass particles was 7.1 μm.

Example 3

Gas atomization of metallic glass was carried out in the same manner as in Example 1, except for setting the gas pressure to 70 kgf/cm$^2$. The average number density of metallic glass nanowires which formed was 20.5 per mm$^2$, and the particle mean diameter of the spherical metallic glass particles was 5.1 μm.

Example 4

Figure 4:
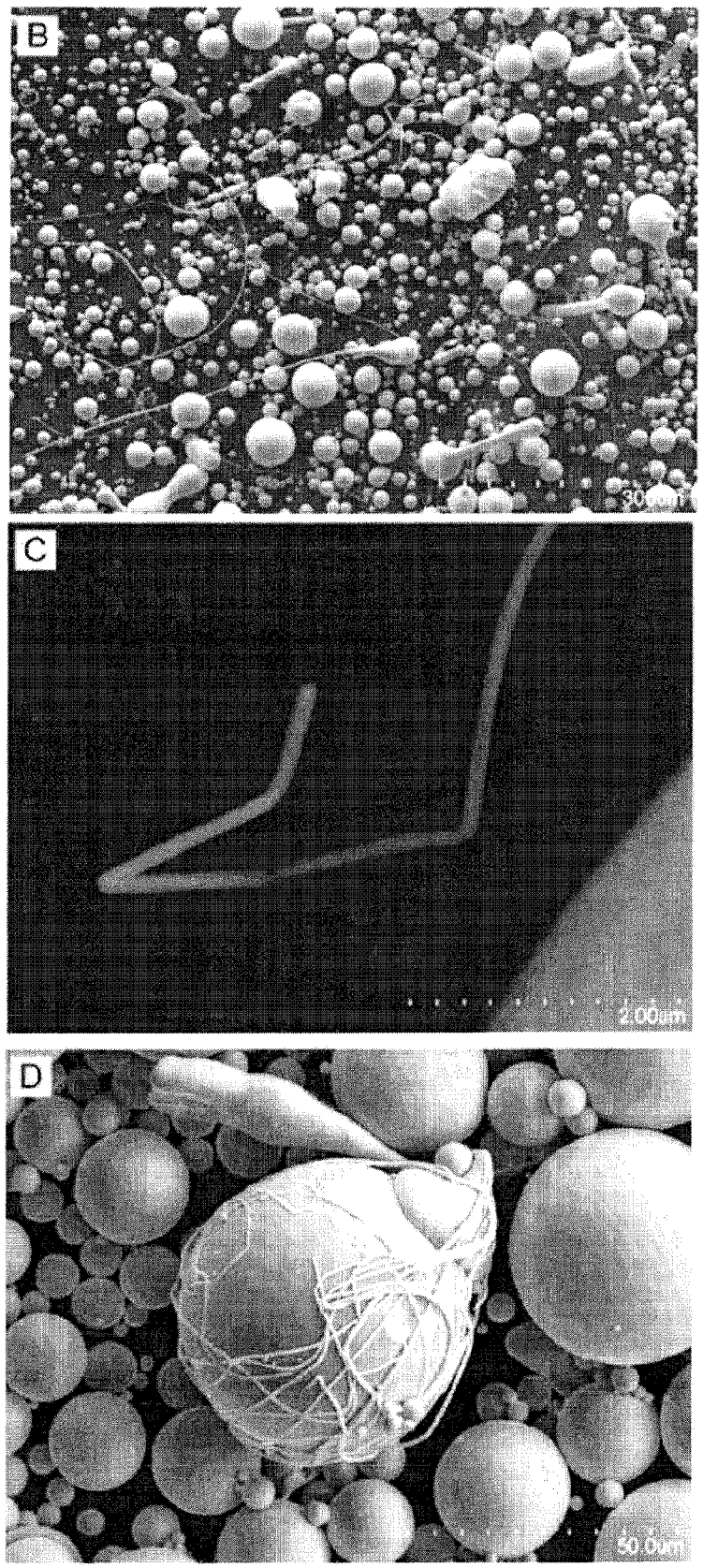
{FIG. 4}

Gas atomization of metallic glass was carried out in the same manner as in Example 1, except for setting the gas pressure to 95 kgf/cm$^2$. FIG. 4(B) is an SEM photograph of metallic glass nanowires obtained in Example 4. Substantially no thin fragments of irregular shape were observed, but it was verified that metallic glass nanowires had formed, together with spherical particles and metallic glass particles of ellipsoidal shape. The density of metallic glass nanowires which formed was 30.5 per mm$^2$, and the particle mean diameter of the spherical metallic glass particles was 4.5 μm. FIG. 4(C) is a partially enlarged view of the metallic glass nanowires in the SEM photo of FIG. 4(B). The metallic glass nanowires which formed were 110 nm in diameter. FIG. 4(D) is a partially enlarged view of metallic glass nanofibers in the SEM photo of FIG. 4(B). It was verified that metallic glass nanofibers of entangled metallic glass nanowires had formed in localized fashion on spherical particles 50 μm in diameter.

Figure 5:
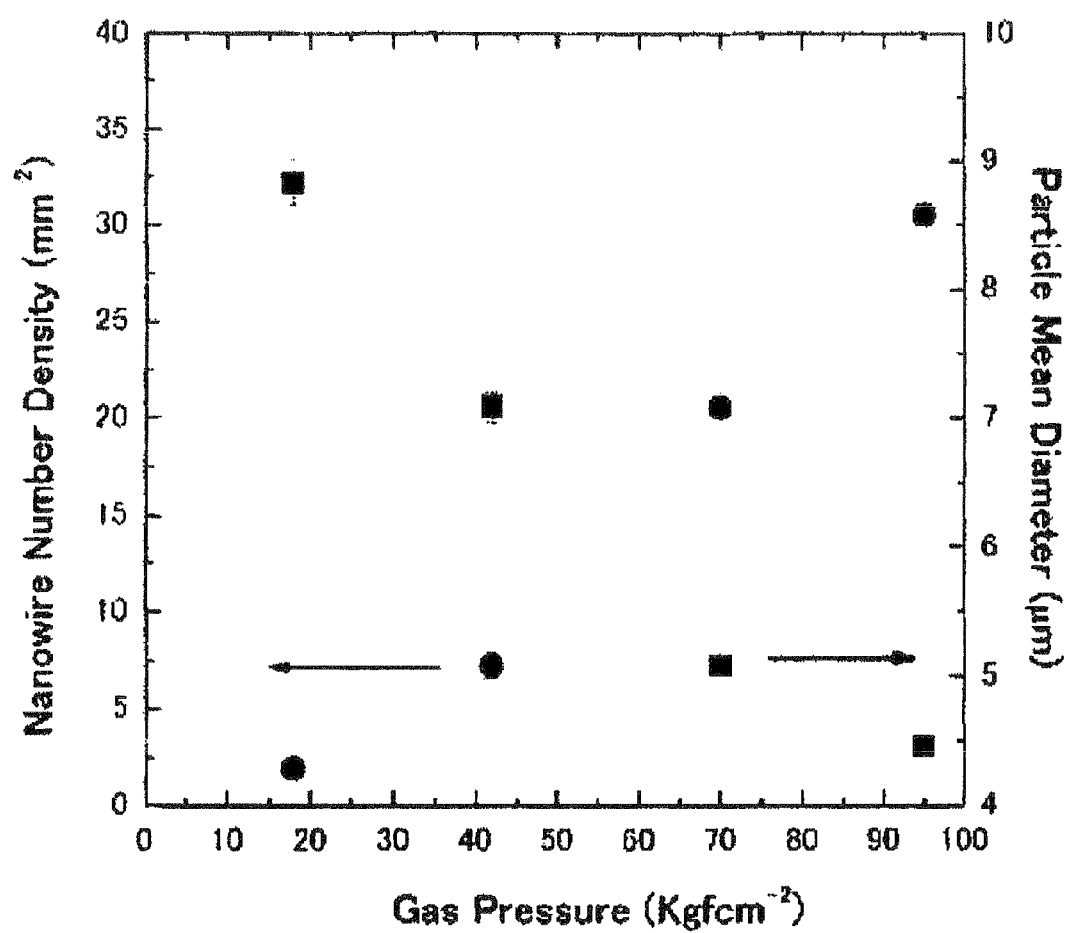
{FIG. 5}

FIG. 5 is a diagram representing the relationship of average density of the metallic glass nanowires, and particle mean diameter of the metallic glass particles, manufactured in Examples 1 to 4. It is clear from FIG. 5 that, at higher gas pressures, the metallic glass particles are smaller in diameter, and the average density of the metallic glass nanowires per unit surface area is greater.

Example 5

Figure 6:
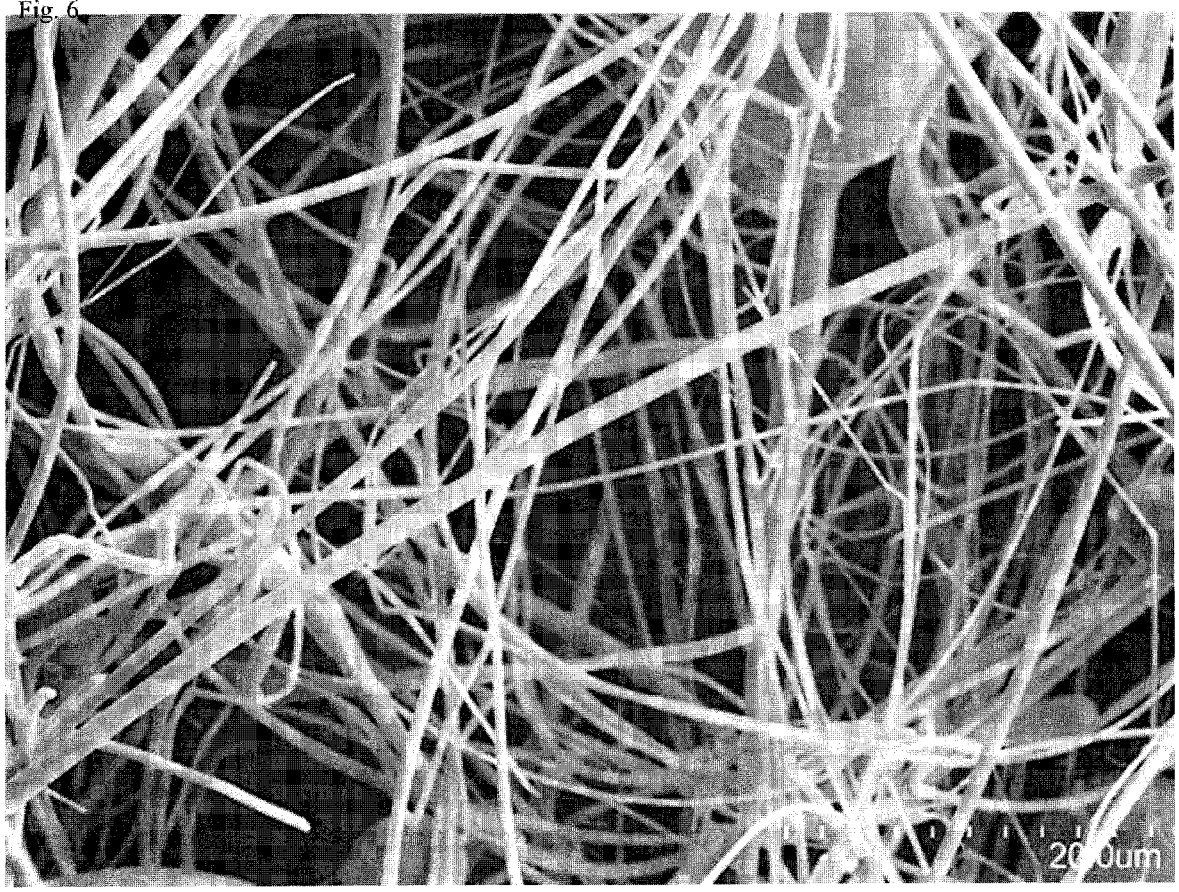
{FIG. 6}
Figure 7:
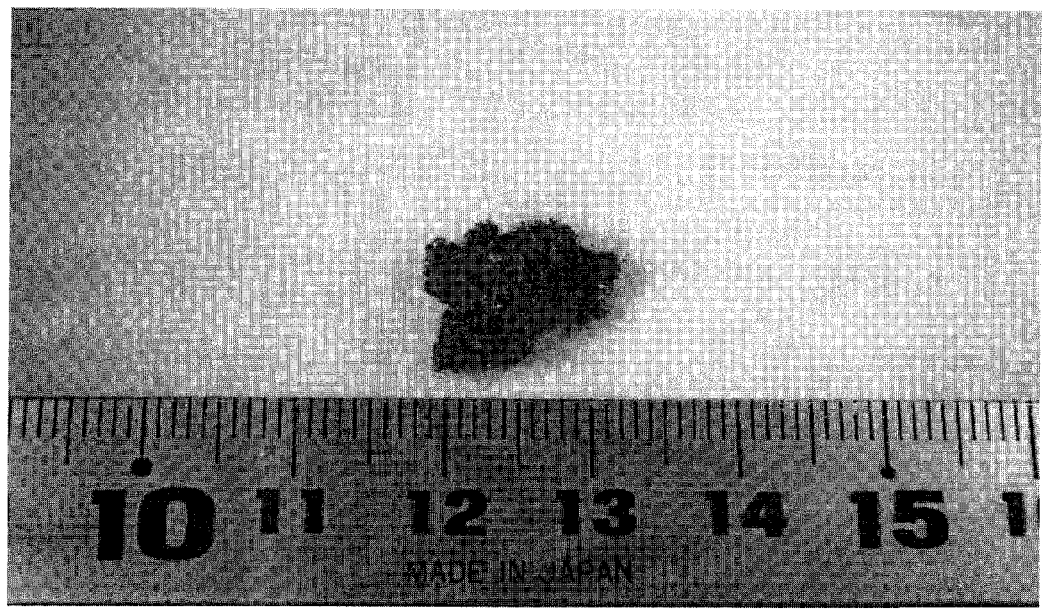
{FIG. 7}

40 g of metallic glass having the composition $Zr_{65}Cu_{18}Al_{10}Ni_7$ prepared as described above in (Preparation of Zr-based metallic glass) was placed in the crucible 2 of the same gas atomization device as in Example 1, bringing the melt to 1100 K with the induction heating coil 3. The molten flow 5 was sprayed out at 0.3 kgf/cm$^2$ through the spray port 4 in the bottom of the crucible 2, employing high-pressure argon gas at 105 kgf/cm$^2$ in the gas diffusion zone 7 to spray it until no more melt was left in the crucible 2. FIG. 6 is a scanning electron photomicrograph of metallic glass nanofibers obtained in Example 5. The individual wires forming the metallic glass nanofibers formed in Example 5 were of substantially uniform diameter of 50 to 200 nm. FIG. 7 is a photo of the metallic glass nanofibers obtained in Example 5, which, being composed of nanowires retaining the ultra-high strength and hyperelasticity of the metallic glass, were obtained as a mass approximately 1 cm in size, such that it could easily be handled with tweezers.

Figure 8:
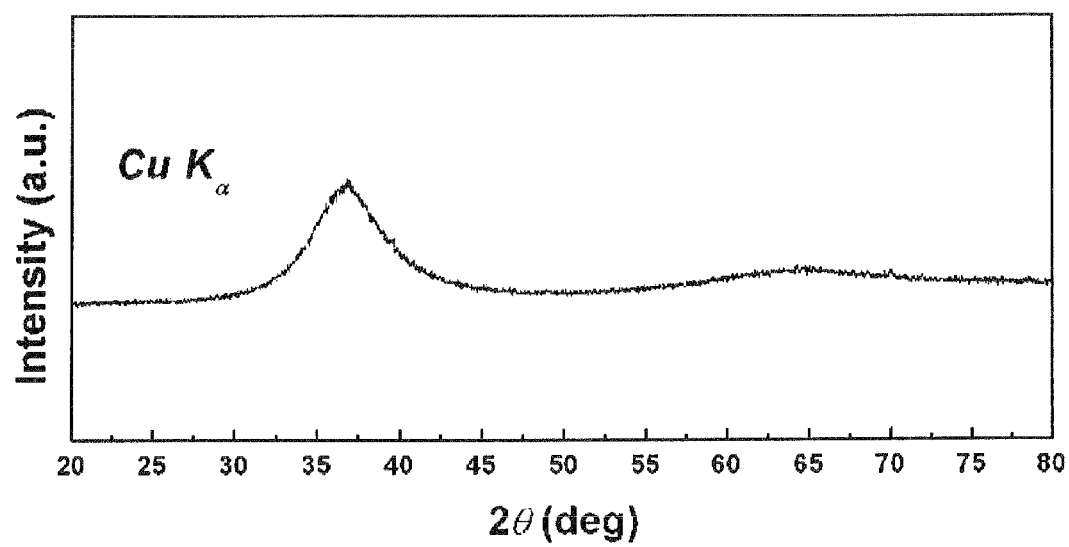
{FIG. 8}
Figure 9:
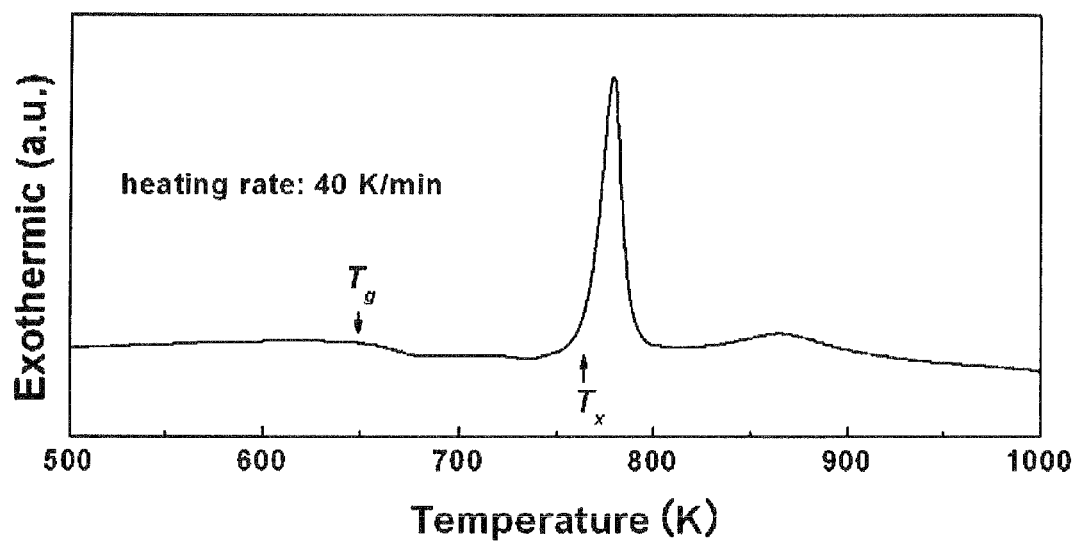
{FIG. 9}

FIG. 8 represents the results of X-ray diffraction of the metallic glass nanofibers obtained in Example 5. A gentle single peak (halo peak), indicative of amorphous structure, was verified. FIG. 9 represents the results of differential scanning calorimetry of the metallic glass nanofibers obtained in Example 5. A distinct glass transition point peak was verified at 649 K. From the preceding, it was verified that the metallic glass nanofibers obtained in Example 5 possess an amorphous structure and maintain vitreosity.

Additionally, the aspect ratios of 10 metallic glass nanowires selected at random from the scanning electron photomicrograph of FIG. 6 were investigated and plotted onto the simulation graph in FIG. 2 (Tm/T=1.04). The results were substantially identical to the simulation, and it was verified that the aspect ratio simulation and actual measured values were substantially identical.

Example 6

Metallic glass nanofibers were formed in the same manner as in Example 5, except for bringing the melt temperature to 1150 K. The aspect ratios of 10 metallic glass nanowires selected at random were investigated and plotted onto the simulation graph in FIG. 2 (Tm/T=1.00). The results were substantially identical to the simulation, and it was verified that the aspect ratio simulation and actual measured values were substantially identical.

The invention claimed is:

1. A method for manufacturing metallic glass nanowire, characterized in that melted metallic glass or a master alloy thereof is subjected to gas atomization in a supercooled state.

2. The metallic glass nanowire manufacturing method according to claim 1, characterized in that said metallic glass is one selected from the group consisting of a Zr-based, a Fe-based, a Pd-based, a Pt-based, and a Ni-based type.

3. The metallic glass nanowire manufacturing method according to claim 1, characterized in that said gas atomization is carried out at gas pressure of 10 $kgf/cm^2$ or above.

4. The metallic glass nanowire manufacturing method according to claim 1, characterized in that said metallic glass nanowires are in a fibrous state of an entanglement of a plurality of the metallic glass nanowires.

5. The metallic glass nanowire manufacturing method according to claim 4, characterized in that said gas atomization is carried out at gas pressure of 70 $kgf/cm^2$ or above.

6. The metallic glass nanowire manufacturing method according to claim 2, characterized in that said gas atomization is carried out at gas pressure of 10 $kgf/cm^2$ or above.

7. The metallic glass nanowire manufacturing method according to claim 2, characterized in that said metallic glass nanowires are in a fibrous state of an entanglement of a plurality of the metallic glass nanowires.

8. The metallic glass nanowire manufacturing method according to claim 7, characterized in that said gas atomization is carried out at gas pressure of 70 $kgf/cm^2$ or above.

* * * * *